United States Patent [19]
Markovs

[11] Patent Number: 5,523,067
[45] Date of Patent: Jun. 4, 1996

[54] REMOVAL OF MERCURY FROM NATURALLY OCCURRING STREAMS CONTAINING ENTRAINED MINERAL PARTICLES

[75] Inventor: John Markovs, Yorktown, N.Y.

[73] Assignee: UOP, Des Plaines, Ill.

[21] Appl. No.: 336,591

[22] Filed: Nov. 9, 1994

Related U.S. Application Data

[63] Continuation-in-part of Ser. No. 97,474, Jul. 26, 1993, abandoned.

[51] Int. Cl.⁶ .......................... C01G 13/00; C22B 43/00; B01D 49/00
[52] U.S. Cl. .................... 423/99; 423/100; 423/210
[58] Field of Search .............. 423/99, 100, 210; 208/251 R; 585/802, 820; 210/914

[56] References Cited

U.S. PATENT DOCUMENTS

| | | | |
|---|---|---|---|
| 3,336,384 | 1/1968 | Pasternack | 208/251 R |
| 4,196,173 | 4/1980 | de Jong et al. | 423/210 |
| 4,500,327 | 2/1985 | Nishino et al. | 55/72 |
| 4,591,490 | 5/1986 | Horton | 423/210 |
| 4,874,525 | 10/1989 | Markovs | 210/673 |
| 4,892,567 | 1/1990 | Yan | 55/33 |
| 4,983,277 | 1/1991 | Audeh et al. | 423/210 |
| 4,986,898 | 1/1991 | Torihata et al. | 585/820 |
| 5,082,569 | 1/1992 | Homeier et al. | 208/251 R |
| 5,271,760 | 12/1993 | Markovs et al. | 75/670 |
| 5,281,259 | 1/1994 | Markovs | 423/210 |
| 5,354,357 | 10/1994 | Markovs et al. | 423/210 |

*Primary Examiner*—Steven Bos
*Attorney, Agent, or Firm*—Thomas K. McBride; John G. Tolomei; Richard P. Silverman

[57] ABSTRACT

Liquid phase hydrocarbon fractions of wet natural gas streams which have been in contact while in the liquid phase with mineral particles entrained in the natural gas stream as it is recovered from the wellhead are found to contain a suspension of such particles. These particles contain loosely bound mercury which is capable of contaminating other constituents of the natural gas stream which come into contact with the particles. Effective procedures to purify such wet natural gas streams must include removal of the mineral particles as well as the element mercury dissolved in the liquid phase hydrocarbons or admixed with the vapor phase hydrocarbons.

12 Claims, 1 Drawing Sheet

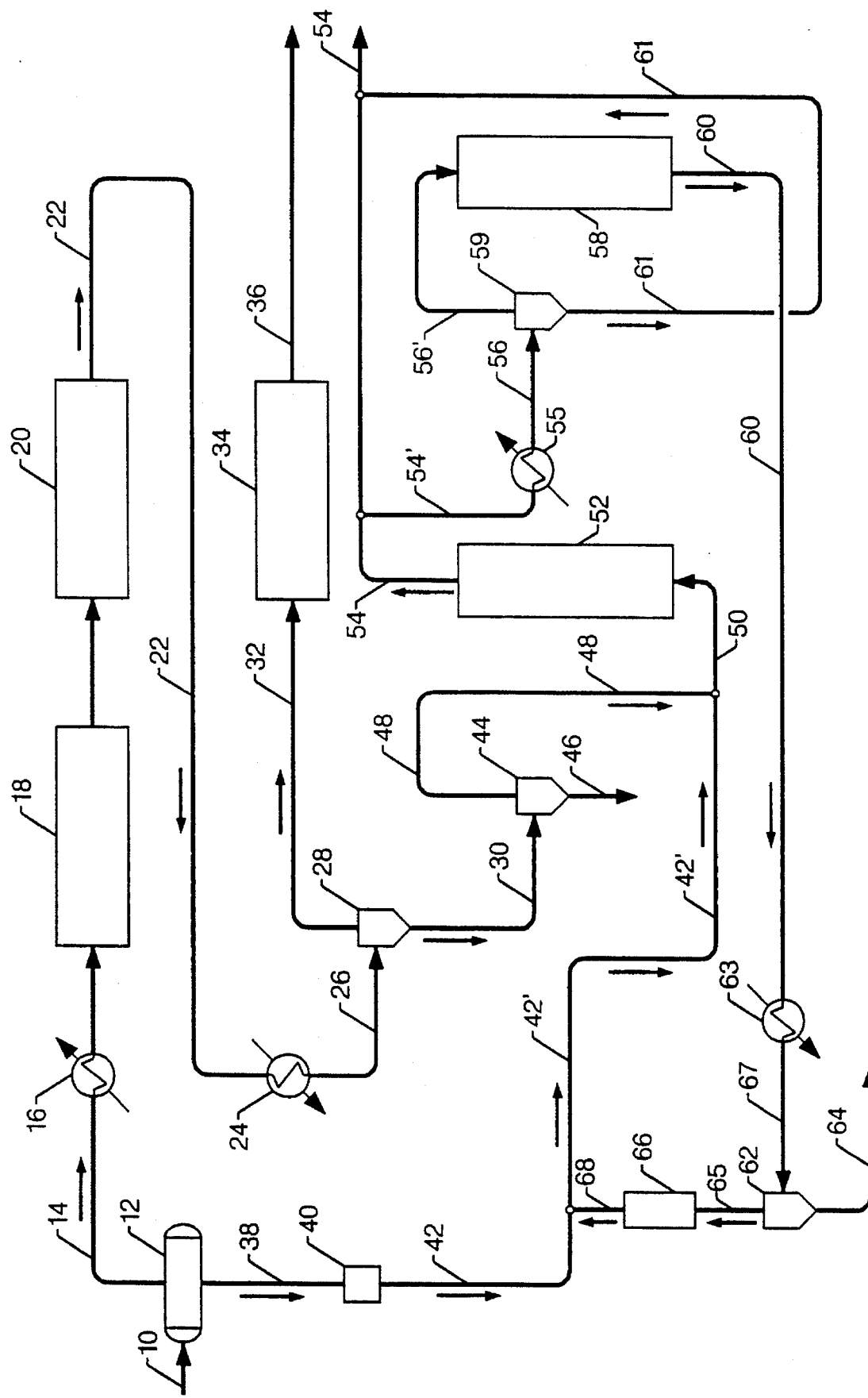
Figure

REMOVAL OF MERCURY FROM NATURALLY OCCURRING STREAMS CONTAINING ENTRAINED MINERAL PARTICLES

CROSS-REFERENCE

This application is a continuation-in-part of application Ser. No. 08/097,474, filed Jul. 26, 1993, now abandoned, and is herein incorporated by reference.

FIELD OF THE INVENTION

This invention relates in general to the removal of mercury present as an impurity in hydrocarbon streams, and more particularly to the removal of mercury from liquid hydrocarbons obtained from wet natural gas deposits.

BACKGROUND OF THE INVENTION

The composition of natural gas as it is recovered from natural deposits, i.e., at the wellhead, can vary considerably with respect to both organic and inorganic constituents. In addition to the principal constituent, methane, which commonly comprises about 90 volume percent, natural gas can contain ethane, propane, butane and higher hydrocarbons as well as nitrogen, carbon dioxide, hydrogen sulfide, and water. Those natural gas compositions containing condensable hydrocarbons such as propane, butane and pentane are referred to in the industry as wet gas, as distinguished from lean gas in which condensable hydrocarbons are not present, and dry gas in which the water content has been appreciably reduced. Sour gas contains $H_2S$ and other sulfur compounds above specification limits. Mercury is present as an impurity in most natural gas streams and can be present in amounts as low as 0.02 $\mu g/Nm^3$ (micrograms per normal cubic meter) and as high as 300 $\mu g/Nm^3$. In the main the mercury impurity is in the form of elemental mercury, but in at least some instances mercury compounds, including organic mercury compounds, are also present. Although permissible levels of mercury impurity vary considerably depending upon the ultimate intended use of the purified product, a mercury concentration greater than about 0.01 $\mu g/Nm^3$ is considered undesirable, particularly in those instances in which the natural gas is to be liquefied by cryogenic processing.

In treating natural gas to achieve compliance with pipeline or use specifications, water is generally removed by absorption in hygroscopic liquids or adsorption on desiccants such as zeolitic molecular sieves. The acidic gases such as $H_2S$ and $CO_2$ can also be removed by adsorption on solid adsorbents or by means of regenerable chemical solvents which selectively react with these impurities to form complexes. The liquid hydrocarbon constituents of wet natural gas streams are usually recovered, at least in part, by pressure and/or temperature reduction to cause condensation of the less volatile species. The purification processes for removing mercury impurities are largely adsorption procedures, and in these perhaps the most common type of adsorbent is an activated carbon having supported thereon a mercury reactive material such as potassium iodide, sulfur, sulfuric acid, chlorine, silver, copper or various salts of silver or copper. Other supports for the mercury reactive materials include silicas, aluminas, silica-aluminas and zeolitic aluminosilicates. Ion-exchange resins, particularly the strongly basic anion-exchange types which have been reacted with a polysulfide, have also been reported as useful mercury adsorbents. See U.S. Pat. No. 4,591,490 (Horton) in this latter regard. The disclosure of U.S. Pat. No. 4,500,327 (Nishino) and U.S. Pat. No. 4,196,173 (de Jong et al.) are pertinent to the use of activated carbon supports. The disclosure of U.S. Pat. No. 4,983,277 (Audeh et al.) and U.S. Pat. No. 4,986,898 (Torihata et al.) relate to the use of alumina supports. The disclosure of U.S. Pat. No. 4,874,525 (Markovs) relates to the use of zeolite adsorbents for mercury removal.

It is also known that the effluent gas streams from many natural gas wells with relatively high flow rates contain entrained particles of mineral species derived from the sedimentary rock formations in which the natural gas deposits are formed. It is the usual practice to permit such particles to become disentrained by the force of gravity as the space velocity of the emerging gas stream is lowered by passage through a large expansion chamber located between the wellhead and the downstream treating facilities. In the case of wet gas streams, the solid mineral particles are conveniently accumulated in the slug catcher, designed to remove slugs of liquid hydrocarbons which condense out of the gas stream after it leaves the well, and periodically removed therefrom for disposal.

BRIEF DESCRIPTION OF THE DRAWINGS

The sole FIGURE of the drawings is a schematic flow diagram showing one embodiment of the process system used in the practice of this invention.

SUMMARY OF THE INVENTION

It has now surprisingly been discovered that the liquid phase hydrocarbon fraction of natural gas streams which has been in contact in the liquid phase with mineral particles entrained in the gas stream as it is recovered at the wellhead contains a suspension of said mineral particles and that these suspended mineral particles contain mercury in a form which permits the release of elemental mercury to the environment surrounding the particles. The colloidal or near-colloidal size of the mineral particles, moreover, prevents their effective removal by passage of the liquid hydrocarbon stream in which they are suspended through a conventional adsorption bed designed to remove mercury as a solute in liquid phase hydrocarbon streams. As a consequence, the apparent reduction of dissolved mercury impurity from particle-containing feedstocks by conventional adsorption techniques is in fact only temporary since in due course mercury derived from the entrained mineral particles again contaminates the prior-treated feedstock and any environment in which it is placed. Accordingly in the process for reducing the mercury content of liquid hydrocarbons recovered from a wet natural gas deposit, said liquid hydrocarbons containing, as a consequence of being recovered from the natural gas deposit, mineral particles associated with elemental mercury, said process comprising the steps of:

a) providing a fixed adsorption bed containing a zeolite adsorbent on which elemental mercury is selectively and reversibly adsorbed from admixture with said hydrocarbons; and b) passing said hydrocarbons through said fixed adsorption bed and recovering an effluent hydrocarbon reduced in mercury content;

the improvement which comprises treating said liquid hydrocarbons in a solid particle removal zone to remove at least a portion, preferably substantially all, of the mineral particles associated with elemental mercury suspended therein before treating said hydrocarbons in accordance with step (b) preferably to provide an effluent hydrocarbon product with less than 1 ppb-wt mercury, and more preferably to provide an effluent hydrocarbon product with less than 0.02 ppb-wt mercury.

DETAILED DESCRIPTION OF THE INVENTION

The precise nature of the mercury-bearing mineral particles suspended in the liquid hydrocarbon phase of the wet natural gas streams involved in the present invention is not known. By slowly evaporating the liquid hydrocarbon phase removed from the slug catcher, a viscous semi-solid mass of the particles can be recovered. By x-ray diffraction analysis, at least a portion of the solids were found to be crystalline, but due to the presence of appreciable amorphous material or the presence of crystalline particles having extremely small crystallite sizes, or both, it was possible to obtain a spectrum of only the more intense d-spacings. By a comparison of these d-spacings with spectra of known sedimentary mineral species it appears likely that the minerals maghemite, siderite and metacinnabar are present, but may not constitute the major portion of the solids. Maghemite is classified as an iron oxide and siderite is a mineral form of iron carbonate, which can account for the paramagnetic property of the solids mass. Metacinnabar is chemically mercury sulfide, but this composition does not provide for all of the mercury content of the solids. Elemental mercury is also detected as being present which may account in part for the observed ability of the mineral-derived particles to readily impart mercury as a solute to the liquid hydrocarbon phase in which the particles are suspended. By chemical analysis and induction coupled plasma emission spectroscopy, a sample of the suspended solids was found to comprise about 2.4 weight percent mercury, 3.2 weight percent sulfur, and 10.1 µg/gram of arsenic. The other metal or metalloid elements detected and their relative concentrations are listed below either in terms of micrograms/gram or weight percent.

| Element | Conc., µg/g | Element | Conc., Weight % |
| --- | --- | --- | --- |
| Al | 679 | Ca | 4.06 |
| B | 43.3 | Fe | 19.1 |
| Ba | 17.5 | Mg | 0.125 |
| Cu | 773 | Mn | 0.178 |
| Ni | 408 | Na | 0.107 |
| P | 122 | Si | 0.206 |
| Pb | 32.5 | | |
| Sn | 91.7 | | |
| Sr | 851 | | |
| Ti | 87.0 | | |
| V | 50.5 | | |
| Zn | 48.2 | | |

It is possible that in addition to free elemental mercury and mercury chemically bonded to other elements in the lattice of crystalline compositions, other forms are present such as amalgams, hydrocarbon-soluble compounds and chemically or physically adsorbed mercury. Whatever the form or forms, at least some mercury is capable of being converted to a hydrocarbon solute and some is retained on or as a part of the solid particles.

The particle size range of the mineral solids carded out of the natural gas deposit by the flowing gas stream is not known with certainty, but is likely in the range of 0.3 to 20 microns, with a more narrow range of about 0.3 to 5 microns becoming suspended in the condensed liquid hydrocarbon phase recovered at the wellhead. As such, the bulk of these particles can pass through the macropore structure of a conventional adsorption bed intended to adsorb mercury in either the vapor phase or dissolved in liquid hydrocarbons. It is, however, possible to remove particles from suspension in a liquid medium by passage through any of several well-known filtering devices and filter media. The filters include gravity, pressure and vacuum types, with the latter two being generally preferred due to the small particle size of the solids to be removed. For this reason the use of porous block mediums such as those formed from carbon and graphite are advantageous, particularly where the amount of solids to be removed from the hydrocarbon suspension is relatively small. Filter aids such as kieselguhr or diatomaceous earth can also be employed in the known manner, particularly when the solids are of colloidal or near-colloidal size.

It is also possible, at least in some instances in which the particles to be removed are greater than colloidal size, to employ centrifugation. Evaporation of the hydrocarbon suspending medium can also be resorted to, but this technique may increase the dissociation of elemental mercury from the solid particle and result in somewhat higher elemental mercury impurity levels in the hydrocarbon product.

Following treatment of the liquid hydrocarbon to remove the mercury-containing mineral particles, the resulting hydrocarbon product is further treated to remove the mercury dissolved or in admixture therewith. This treatment can be either in the liquid or the vapor phase and is accomplished by selective adsorption of the mercury on any of the well-known adsorption media used for this purpose. Preferred adsorbents are those which comprise constituents chemically reactive with mercury or mercury compounds. Various cationic forms of several zeolite species, including both naturally occurring and synthesized compositions, have been reported by Barrer et al. [J. Chem. Soc. (1967) pp. 19–25] to exhibit appreciable capacities for mercury adsorption due to the chemisorption of metallic mercury at the cation sites. Some of these zeolitic adsorbents reversibly adsorb mercury and others exhibit less than full, but nevertheless significant, reversibility. An especially effective adsorbent for use in the present process is one of the zeolite-based compositions containing cationic or finely dispersed elemental forms of silver, gold, platinum or palladium. A particularly preferred adsorbent of this type is disclosed in U.S. Pat. No. 4,874,525 (Markovs) wherein the silver is concentrated on the outermost portions of the zeolite crystallites. This adsorbent, as well as the other zeolite-based adsorbents containing ionic or elemental gold, platinum, or palladium, is capable of selectively adsorbing and sequestering organic mercury compounds as well as elemental mercury. Zeolite A containing elemental gold is disclosed as an adsorbent for mercury in the later issued U.S. Pat. No. 4,892,567 (Yan). The specific mention of these materials is not intended to be limitative, the composition actually selected being a matter deemed most advantageous by the practitioner given the particular circumstances to which the process is applied.

The temperature and pressure conditions for the filtration and the adsorption purification steps are not critical and depend to some degree upon the particular feedstock being purified and whether the adsorption step is to be carried out in the liquid or in the vapor phase. Temperatures typically range from about 16° C. to 60° C. in the beds during the adsorption-purification step. If the adsorption bed is to be regenerated the purge medium is heated to at least 100° C., and preferably at least 200° C., higher than the temperature of the feedstock being purified. Pressure conditions can range from 20 to 2500 psia and are generally not critical, except of course during liquid phase operation wherein it is necessary to maintain sufficient pressure at the operating temperature to avoid vaporization of the feedstock and regeneration medium.

DETAILED DESCRIPTION OF THE DRAWING

A preferred embodiment of the present invention is illustrated by the following example together with the flow diagram of the drawing. A feedstock wet natural gas stream from the wellhead is transported to the purification system through line 10 and upon arrival at the slug catcher 12 is at a temperature of about 22° C. and comprises a liquid phase containing mainly $C_2$–$C_{30}$ hydrocarbons and a vapor phase comprising principally methane along with a minor amounts of higher molecular hydrocarbons, water vapor, carbon dioxide and sulfur compounds such as $H_2S$. Both the liquid and gas phases contain mercury. Solid phase mineral particles derived from the well formation are entrained mostly in the liquid phase. From line 10 the feedstock enters slug catcher 12 wherein essentially all of the solid and liquid phases are separated from the vapor phase, the latter, now an essentially lean natural gas stream, being passed through line 14 to heater 16 and then into a non-regenerable adsorption bed 18 containing copper sulfide supported by an alumina. In heater 16 the temperature is raised to about 25° C. in order to prevent hydrocarbon condensation in the macropores of the adsorbent mass in bed 18. The natural gas stream entering bed 18 contains about 5 µg/Nm³ of mercury vapor, which by passage through bed 18 is reduced. The gas stream emerging from bed 18 contains, additionally, impurity levels of $CO_2$ and $H_2S$ which are removed by absorption in a hot potassium carbonate solution in treater 20. The essentially $H_2S$- and $CO_2$-free gas stream effluent from treater 20 is at a temperature of about 104° C. and contains about 0.55 µg/Nm³ mercury. It is also saturated with water vapor. This effluent is passed through line 22 to cooler 24 wherein the temperature is reduced to about 20° C. and then through line 26 to separator 28 for the removal of condensed water and liquid hydrocarbons through line 30. The overhead from separator 28, i.e, methane and other vapor phase hydrocarbons, contains about 0.5 µg/Nm³ mercury impurity and is saturated with water vapor at 20° C. This vapor steam is passed through line 32 to a compound adsorption bed 34 which comprises a water removal section of sodium zeolite A adsorbent, and a mercury removal section of silver-loaded sodium zeolite X. The effluent stream from bed 34 through line 36 is essentially free of water vapor and contains less than 0.01 µg/Nm³ mercury i.e., can be satisfactorily liquefied by conventional cryogenic procedures. The liquid composition from the bottom of separator 28 comprises globules of liquid water and globules of liquid hydrocarbon. This mixture is passed through line 30 to means 44 wherein the globules of each material are caused to coalesce into their respective single continuous phases to facilitate separation of the liquid hydrocarbon phase from the liquid water phase. The liquid water phase is withdrawn from the system through line 46 and the liquid hydrocarbon phase, which contains about 2 ppb (wt.) of mercury, is removed from means 44 through line 48 and combined with the liquid hydrocarbon stream flowing through line 42. This latter liquid hydrocarbon stream originates in slug catcher 12, and upon removal therefrom comprises water, liquid hydrocarbons and about 0.001 weight percent suspended mineral particles containing mercury. The total mercury content is about 0.25 µg/g of liquid phase effluent (including suspended solids), about 95 percent by weight of which is associated with the suspended solids. This stream is passed via line 38 through filter 40 for removal of the suspended mineral particles larger than 0.3 microns. The filter, utilizing pleated cartridges, reduces the solids content of the liquid hydrocarbon stream to essentially zero, and preferably results in a filtered liquid product stream containing less than about 150 ppb dissolved mercury and more preferably containing less than about 10 ppb dissolved mercury. The filter or solid particle removal zone is operated at a temperature less than about 100° C. and preferably is operated at a temperature less than about 50° C. The filtered product stream is passed through line 42 where it joins the liquid hydrocarbon from line 48 and is passed through line 50 to a compound bed 52 which comprises a water removal section of zeolite A adsorbent and a mercury removal section of silver loaded zeolite X. The effluent stream from bed 52 is removed from the system through line 54. This effluent is essentially free of water and contains less than 0.02 ppb weight of mercury, i.e., it can be processed for cryogenic recovery of the light components.

The zeolite adsorbent compound bed is regenerated by passing at least a portion of effluent stream 54 in line 54' to a heater 55 to provide vaporized regenerant stream 56 and intermittently passing the vaporized regenerant stream to the compound bed 58 via line 56', preferably in a direction that is countercurrent to the direction in which liquid hydrocarbon stream 50 entered the compound bed to desorb the mercury and to provide a spent regenerant stream 60. Generally, two or more compound beds will be employed to provide a continuous process wherein one compound bed is removing mercury from the liquid hydrocarbon stream and another compound bed is being regenerated. The spent regenerant stream 60 is cooled in cooler 63 and passed in line 67 to a condenser 62 where it is condensed to provide a water phase 64, if water is present, and a recovered hydrocarbon phase 65. The recovered hydrocarbon phase is passed to a non-regenerative mercury removal bed 66 containing sorbents such as activated carbon, silicas, aluminas and mixtures thereof having supported thereon a mercury reactive material as hereinabove described to provide a second treated hydrocarbon stream 68. The non-regenerative mercury removal bed 66 reduces the mercury content of the recovered hydrocarbon phase to about 10 ppb-wt mercury. The second treated hydrocarbon stream 68 is admixed with the filtered liquid product stream 42 and passed to the compound bed 52 via lines 42' and 50.

In an alternate embodiment, the at least a portion of the effluent stream 54 is passed via line 54' to heater 55 to partially vaporize the effluent stream in line 56. Following a vapor/liquid separation in separator 59, the vaporized portion of the effluent stream is passed in line 56' to compound bed 58 as the vaporized regenerant stream. The liquid portion of the effluent stream 61 is combined with the remainder of the effluent stream in line 54 and recovered as a liquid product. This embodiment provides the benefit of using the more volatile components of the effluent stream as the regenerant stream while diverting the heavier components in the effluent stream away from the molecular sieve. This will minimize coking of the heavier hydrocarbon components ($C_6$–$C_{30}$) on the molecular sieve during regeneration at regeneration temperatures ranging from about 100° C. to about 350° C. and thereby provide a longer useful life for the adsorbent.

The following examples are provided to illustrate the present invention and is not intended to limit the scope of the claims that follow.

EXAMPLES

EXAMPLE I

A mercury-containing hydrocarbon stream derived from natural gas liquids and having mainly $C_2$–$C_{30}$ hydrocarbons contains 250 ppb-wt mercury. The mercury-containing hydrocarbon stream at a temperature of about 20° C. is passed to a compound adsorbent bed containing a zeolite A molecular sieve in a first layer and a zeolite-based adsorbent supporting ionic or elemental silver disposed on its surface in a second layer to provide a treated product. The zeolite based adsorbent removes about 10 ppb-wt mercury, resulting in a treated product containing about 240 ppb-wt mercury.

EXAMPLE II (Invention)

The mercury-containing hydrocarbon stream of Example I was passed to a 0.3 micron filter at a temperature of about 25° C. to remove entrained solids, producing a filtered hydrocarbon stream having a mercury concentration of about 10 ppb-wt mercury. The filtered hydrocarbon stream flows to the compound adsorbent bed of Example I, to provide a treated hydrocarbon stream having a stable mercury concentration less than about 0.1 ppb-wt mercury such that no increase in mercury concentration is observed.

EXAMPLE III

The mercury-containing hydrocarbon stream of Example I flows to the zeolite-based adsorbent bed of Example I for a first mercury removal step which reduces the mercury content to about 240 ppb-wt, and subsequently flows to the 0.3 micron filter of Example II for a second mercury removal step to provide a treated hydrocarbon stream comprising about 10 ppb-wt mercury. The zeolite-based adsorbent is unable to remove mercury-containing solid particles from the hydrocarbon stream, but successfully removes mercury in solution in the hydrocarbon stream. The filter is only able to remove the mercury in the solid form, but not before the solids are able to recontaminate the liquid hydrocarbon stream.

Thus, a portion of the solids in the product of the first removal step returns the mercury level in the first treated hydrocarbon stream to about 10 ppb-wt. Passing the product of the first mercury removal step to the second mercury step removes the solids, but does not affect the concentration of mercury in the solution which remains at about 10 ppb-wt mercury. Thus, the filtration of the mercury-containing liquid hydrocarbon stream at temperatures less than 100° C., and preferably less than about 50° C. prior to the treatment of the mercury-containing liquid hydrocarbon in a compound bed of zeolitic adsorbent permits the reduction of mercury in the hydrocarbon stream to stable levels of about 0.1 ppb-wt mercury.

We claim:

1. A process for removing mercury from a mercury-containing hydrocarbon fluid stream comprising:
   a) passing to a solid particle removal zone a mercury-containing hydrocarbon fluid stream comprising mercury mineral particles, dissolved mercury and mercury which is capable of being converted to a hydrocarbon solute wherein at least a portion of said mercury mineral particles are removed from said hydrocarbon fluid stream to provide a first treated stream having a reduced level of mercury relative to said hydrocarbon fluid stream; and
   b) passing said first treated stream to a first adsorption zone containing a zeolitic adsorbent to reversibly adsorb mercury from said first treated stream and produce a product stream comprising less than 1 ppb-wt mercury.

2. The process of claim 1 wherein said zeolite adsorbent is selected from the group consisting of A, X, and Y zeolite containing cationic or finely dispersed elemental forms of a metal selected from the group consisting of silver, gold, platinum, palladium, and mixtures thereof.

3. The process of claim 1 wherein the first adsorbent zone contains a first adsorbent layer comprising a zeolite A or zeolite X and said first adsorbent zone contains a second adsorbent layer comprising a zeolite A or zeolite X containing ionic or elemental silver.

4. The process of claim 1 wherein said mercury mineral particles are removed by filtration or centrifugation.

5. The process of claim 4 wherein said first treated stream contains mercury mineral particles ranging in size from about 0.3 to about 0.5 microns.

6. The process of claim 5 wherein the first treated stream comprises less than 10 ppb-wt mercury.

7. The process of claim 1 wherein the first treated stream comprises less than about 150 ppb-wt mercury.

8. A process for removing mercury from a mercury-containing hydrocarbon liquid stream comprising:
   a) passing to a solid particle removal zone a mercury-containing hydrocarbon liquid stream comprising water, mercury mineral particles, dissolved mercury and mercury which is capable of being converted to a hydrocarbon solute wherein at least a portion of said mercury mineral particles are removed from said hydrocarbon fluid stream to provide a first treated stream having a reduced level of mercury relative to said hydrocarbon liquid stream;
   b) passing said first treated stream to a first adsorption zone containing a zeolite adsorbent to reversibly adsorb mercury from said first treated stream and produce a product stream comprising less than 1 ppb-wt mercury;
   c) vaporizing at least a portion of said product stream to provide a vaporized regenerant stream and passing said vaporized regenerant stream to said first adsorption zone to desorb mercury and recover a spent mercury-containing regenerant stream;
   d) cooling and condensing said spent regenerant stream and recovering an aqueous phase and a hydrocarbon phase stream;
   e) passing the hydrocarbon phase stream to a second adsorption zone containing a non-regenerable mercury adsorbent to provide a second treated stream; and
   f) admixing at least a portion of said second treated stream with said first treated stream prior to passing said first treated stream to said first adsorption zone.

9. The process of claim 8 wherein said product stream is passed to a vaporizer to produce said vaporized regenerant stream and a liquid product stream and recovering said liquid product stream.

10. The process of claim 8 wherein the solid particle removal zone is operated at a temperature less than about 100° C.

11. The process of claim 8 wherein said vaporizing is at a temperature ranging from about 100° C. to about 350° C.

12. A process for removing mercury from a mercury-containing hydrocarbon fluid stream comprising:
   a) passing to a solid particle removal zone a mercury-containing hydrocarbon fluid stream comprising mercury mineral particles, dissolved mercury and mercury which is capable of being converted to a hydrocarbon solute, said solid particle removal zone operated at a removal temperature less than about 100° C. to remove at least a portion of said mercury mineral particles ranging in size from about 0.3 to 0.50 microns from said hydrocarbon fluid stream to provide a first treated stream having a reduced level of mercury relative to said hydrocarbon fluid stream; and b) passing said first treated stream at an adsorption temperature ranging from about 16° to about 60° C. to a first adsorption zone containing a zeolitic adsorbent to reversibly adsorb mercury from said first treated stream and produce a product stream comprising less than 1 ppb-wt mercury.

* * * * *